US012188630B2

(12) United States Patent
Jun

(10) Patent No.: US 12,188,630 B2
(45) Date of Patent: Jan. 7, 2025

(54) LAMP FOR VEHICLE

(71) Applicant: HYUNDAI MOBIS CO., LTD., Seoul (KR)

(72) Inventor: Young Geun Jun, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/448,866

(22) Filed: Aug. 11, 2023

(65) Prior Publication Data

US 2024/0200744 A1 Jun. 20, 2024

(30) Foreign Application Priority Data

Dec. 20, 2022 (KR) ........................ 10-2022-0179137

(51) Int. Cl.

*F21S 41/33* (2018.01)
*F21S 41/24* (2018.01)
*F21S 41/26* (2018.01)
*F21S 41/43* (2018.01)

(52) U.S. Cl.

CPC ............. *F21S 41/336* (2018.01); *F21S 41/24* (2018.01); *F21S 41/26* (2018.01); *F21S 41/43* (2018.01)

(58) Field of Classification Search

CPC .......... F21S 41/336; F21S 41/24; F21S 41/26; F21S 41/43
See application file for complete search history.

(56) References Cited

U.S. PATENT DOCUMENTS

| | | | | |
|---|---|---|---|---|
| 10,451,237 | B1 * | 10/2019 | Zorn | F21S 41/43 |
| 10,808,902 | B1 * | 10/2020 | Lim | F21S 41/285 |
| 11,428,377 | B2 * | 8/2022 | Lee | F21S 43/14 |
| 11,536,433 | B1 * | 12/2022 | Jin | F21S 41/43 |
| 2013/0242590 | A1 * | 9/2013 | Fedosik | F21S 41/24 362/521 |
| 2014/0036526 | A1 * | 2/2014 | Sato | F21S 41/322 362/518 |
| 2015/0124472 | A1 * | 5/2015 | Wintzer | F21S 41/24 362/522 |
| 2019/0011103 | A1 * | 1/2019 | Suwa | F21S 41/16 |
| 2022/0243887 | A1 * | 8/2022 | Lee | F21S 41/27 |

* cited by examiner

*Primary Examiner* — Tsion Tumebo
(74) *Attorney, Agent, or Firm* — DLA PIPER LLP (US)

(57) ABSTRACT

A lamp for a vehicle including a first light source part that irradiates a first light for forming a first light distribution pattern, a light concentrating unit that concentrates the light emitted from the first light source part, an output unit including an output lens part that outputs the light input from the light concentrating unit, and a second light source part provided on one side of the output lens part in a leftward/rightward direction, and that irradiates a second light for forming a second light distribution pattern that is different from the first light distribution pattern, and the output unit further includes a light guide part formed in the output lens part, and that guides the second light input from the second light source part to the output lens part.

13 Claims, 10 Drawing Sheets

LAMP FOR VEHICLE

CROSS-REFERENCE TO RELATED APPLICATION

This application claims the benefit of priority to Korean Patent Application No. 10-2022-0179137, filed in the Korean Intellectual Property Office on Dec. 20, 2022, the entire contents of which are incorporated herein by reference.

TECHNICAL FIELD

The present disclosure relates to a lamp for a vehicle.

BACKGROUND

A headlamp forms a low beam pattern or a high beam pattern that helps secure a front field of view of a driver during nighttime driving, and plays an important role in safe driving. In recent years, lamps that implement two or more functions have been used in one lamp for a vehicle that shares an optical part. For example, a daytime running light (DRL) and a turn signal lamp function are performed while a light source and a lens are shared.

In a conventional optical system of a lamp for a vehicle that implements two or more functions while sharing an optical part, two or more functions are mostly implemented through the same optical path by disposing light sources of different colors while sharing a light guide or disposing a light source that performs different functions on a rear side of one projection lens.

However, according to the conventional technology, because optical paths for forming different light distribution pattern are the same, there is a limit in variously combining two or more functions. Accordingly, it is necessary to improve a technology for implementing different optical mechanisms that have different optical paths.

SUMMARY

The present disclosure has been made to solve the above-mentioned problems occurring in the prior art while advantages achieved by the prior art are maintained intact.

An aspect of the present disclosure provides a lamp for a vehicle that forms an optical path that implements two optical mechanisms with one lens.

Another aspect of the present disclosure provides a lamp for a vehicle that implements two or more optical functions even when an output lens part is slim.

Another aspect of the present disclosure provides a lamp for a vehicle that enhances a product value of a product by implementing images that are differentiated in design.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a lamp for a vehicle includes a first light source part that irradiates a first light for forming a first light distribution pattern, a light concentrating unit that concentrates the light emitted from the first light source part, an output unit including an output lens part that outputs the light input from the light concentrating unit, and a second light source part provided on one side of the output lens part in a leftward/rightward direction, and that irradiates a second light for forming a second light distribution pattern that is different from the first light distribution pattern, and the output unit further includes a light guide part formed in the output lens part, and that guides the second light input from the second light source part to the output lens part.

The output lens part may include an input surface, to which the light concentrated by the light concentrating unit is input, an output surface, which is opposite to the input surface and from which the input light is output, an upper surface provided at upper ends of the input surface and the output surface, and a lower surface provided at lower ends of the input surface and the output surface, and the light guide part may be integrally formed on at least some of the input surface, the upper surface, and the lower surface of the output lens part.

The light guide part may be formed at an upper end portion of the input surface and on the upper surface.

The output lens part may extend in the leftward/rightward direction, and the light guide part may guide the second light such that the second light travels along an extension direction of the output lens part by reflecting the second light irradiated from the second light source part.

The light guide part may include a plurality of optics protruding to reflect the second light input to the output lens part.

The light guide part may include a plurality of reflective layers that reflects the second light input to the output lens part, and including a reflective material.

Sizes of the plurality of reflective layers may be gradually changed as they go from one side to an opposite side of the output lens part in the leftward/rightward direction.

The lamp may further include a shield member, when a part of the input surface of the output lens part, in which the light guide part is formed, is defined as a first area, and an area of the input surface, except for the first area, is defined as a second area, provided in a direction that faces the light concentrating unit of the output lens part such that the light irradiated from the light concentrating unit toward the output unit and installed on a path of the first light.

One end of the shield member may be located at an upper end portion of the light concentrating unit, and an opposite end of the shield member may be located at a point, at which the first area and the second area meet each other.

The shield member may absorb at least a portion of the first light, totally reflect the remaining portion of the first light, and input the remaining portion to the second area of the input surface.

The output lens part may include may include a recessed part that is recessed toward the output surface such that the first light input to the input surface faces the output surface.

The output lens part may include a guide layer located at a location, at which the first area and the second area meet each other such that first light input to the input surface faces the output surface, formed in an interior of a body of the output lens part, and including a reflective material.

When a direction, in which the light is output from the output lens part, is defined as a forward direction and an opposite direction to the forward direction is defined as a rearward direction, the output lens part may include an input lens, to which the first light is input, and an upper end portion of which is connected to an opposite end of the shield member, and an output lens formed in the forward direction of the input lens, of which a height of the upper surface is formed to be higher than the upper surface of the input lens, and in which a curve is formed at a portion, at which the upper surface and the output surface meet each other, and the light guide part may be formed in an area of the upper surface of the output lens or the rear surface of the output lens, which is higher than the upper surface of the input lens.

The light concentrating unit may include a first light concentrating lens part disposed in a forward direction of the first light source part, and that concentrates the light input from the first light source part, and a second light concentrating lens part disposed in the forward direction of the first light concentrating lens part and that concentrates the light input from the first light concentrating lens part, and the first light concentrating lens part may diffuse the concentrated light in an upward/downward direction and input the light to the second light concentrating lens part, and the second light concentrating lens part may diffuse the concentrated light in the leftward/rightward direction and input the light to the output lens part.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, embodiments of the present disclosure will be described in detail with reference to the accompanying drawings.

First, the embodiments described below are embodiments that are suitable for helping understand technical features of a lamp for a vehicle of the present disclosure. However, neither the present disclosure is limited by the embodiments that will be described below nor the technical features of the present disclosure are not limited by the described embodiments, and the present disclosure may be variously modified within the technical features of the present disclosure.

Figure 1:
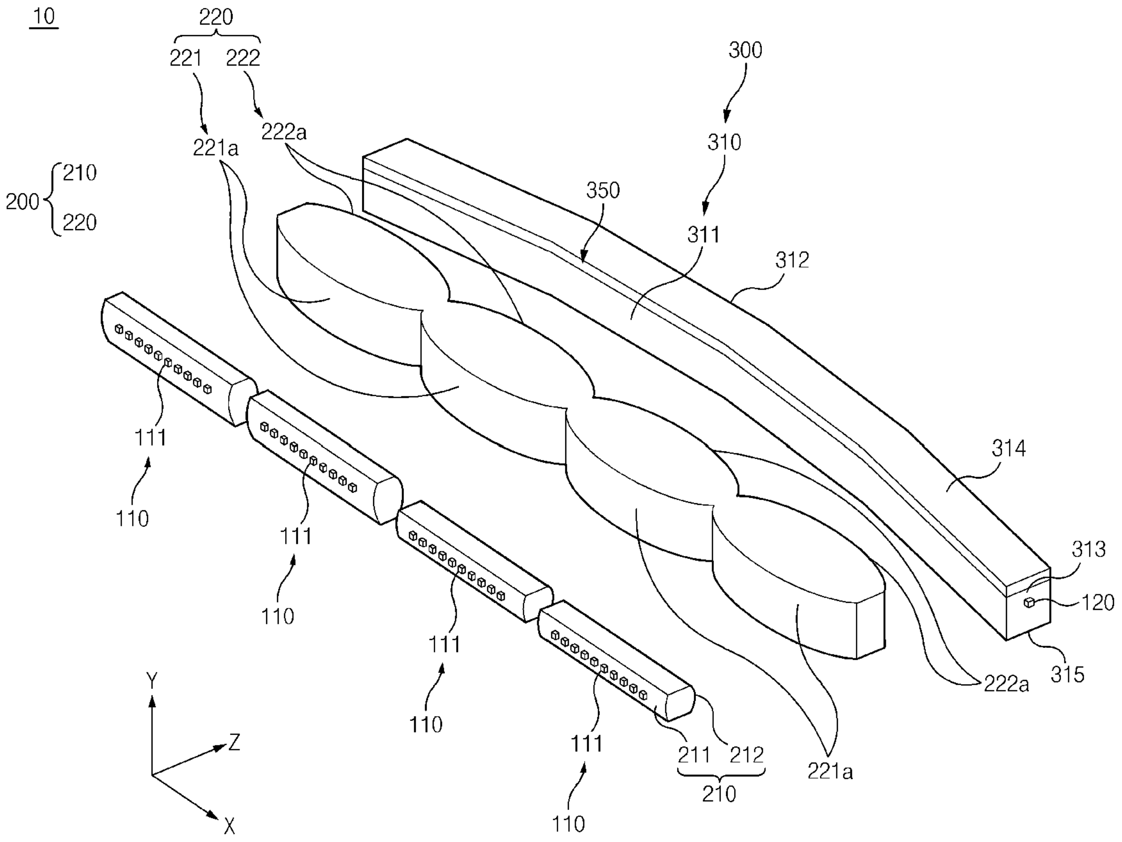
FIG. 1 is a perspective view illustrating a lamp for a vehicle according to a first embodiment of the present disclosure.
Figure 2:
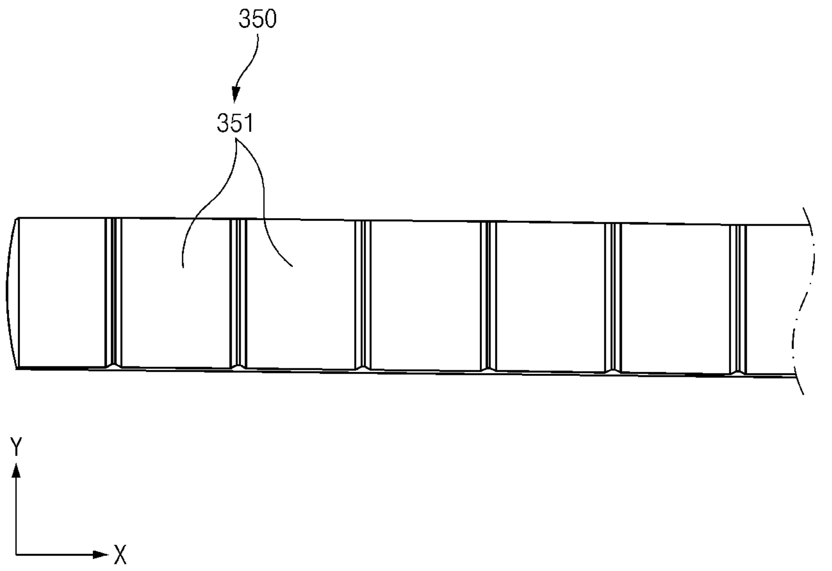
FIG. 2 is a view illustrating an example of a light guide part applied to a lamp for a vehicle according to a first embodiment of the present disclosure.
Figure 3:
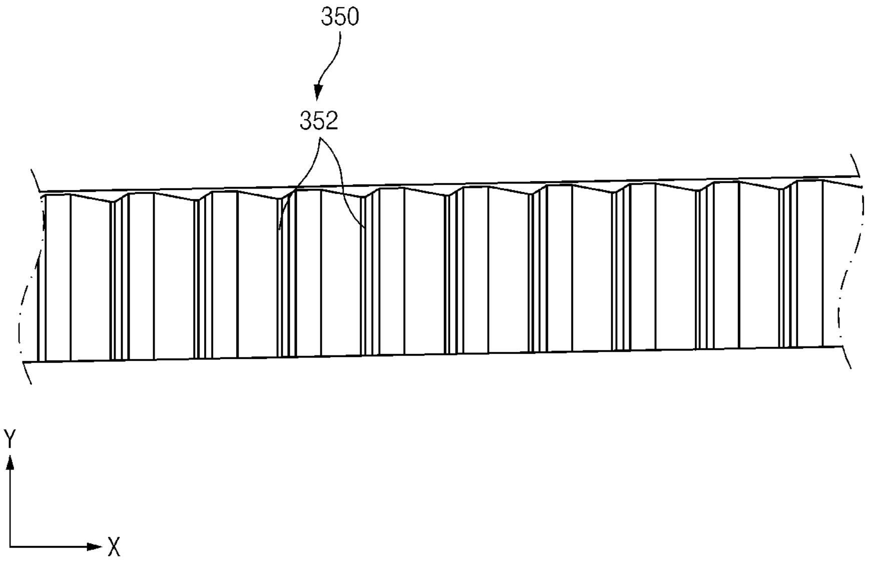
FIG. 3 is a view illustrating another example of a light guide part applied to a lamp for a vehicle according to a first embodiment of the present disclosure.
Figure 4:
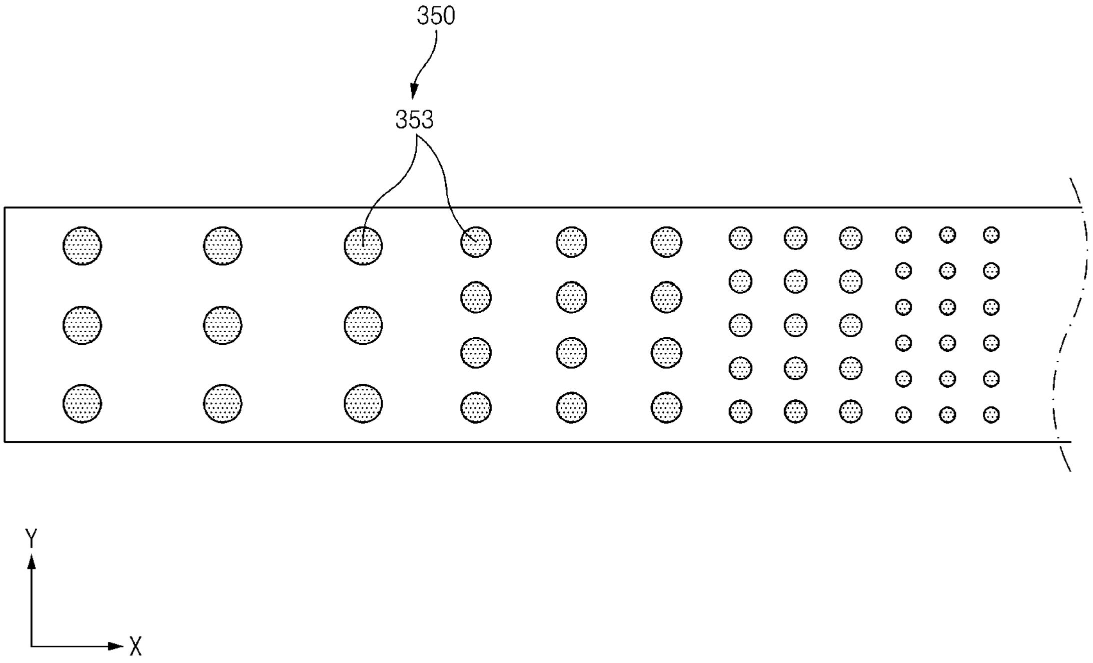
FIG. 4 is a view illustrating another example of a light guide part applied to a lamp for a vehicle according to a first embodiment of the present disclosure.

FIG. 1 is a perspective view illustrating a lamp for a vehicle according to a first embodiment of the present disclosure, FIG. 2 is a view illustrating an example of a light guide part applied to the lamp for a vehicle according to the first embodiment of the present disclosure, FIG. 3 is a view illustrating another example of the light guide part applied to the lamp for a vehicle according to the first embodiment of the present disclosure, and FIG. 4 is a view illustrating another example of the light guide part applied to the lamp for a vehicle according to the first embodiment of the present disclosure.

Referring to FIGS. 1 to 4, a lamp 10 for a vehicle according to an embodiment of the present disclosure includes a first light source part 110, a light concentrating unit 200, an output unit 300, and a second light source part 120. Hereinafter, a direction, in which light is output from an output lens part 310 will be defined as a forward direction, an opposite direction to the forward direction will be defined as a rearward direction, and the forward direction and the rearward direction will be defined as a forward/rearward direction (direction "Z") together. Furthermore, a direction that is perpendicular to the forward/rearward direction "Z" and is parallel to a ground surface will be defined as a leftward/rightward direction (direction "X"), and a direction that is perpendicular to the forward/rearward direction "Z" and the leftward/rightward direction "X" will be defined as an upward/downward direction (direction "Y").

The first light source part 110 is configured to irradiate a first light for forming a first light distribution pattern. The first light source part 110 may include a plurality of light sources.

For example, the light source may include various elements or devices that may emit light. For example, the light source may include light emitting diodes (hereinafter, LEDs), but the present disclosure is not limited thereto, and various lamps, such as laser diodes, bulbs, halogen lamps, or xenon lamps (HID), may be used.

The first light source part 110 may include a plurality of light sources, and the number and an arrangement of the light sources may be determined according to a design specification of the lamp. For example, the plurality of light sources may be arranged in the leftward/rightward direction "X", and may be divided into a plurality of groups. Here, the plurality of light sources may be turned on or off for the groups or individually. However, the arrangement of the plurality of light sources is not limited thereto.

Here, the first light distribution pattern formed by the first light source part 110 may be a low beam pattern, a high beam pattern, an adaptive driving beam (ADB), or an infrared night vision pattern. However, the first light distribution pattern is not limited thereto.

The light concentrating unit 200 is configured to concentrate the light emitted from the first light source part 110. In detail, the light concentrating unit 200 may concentrate the light irradiated from the first light source part 110 such that most of the light emitted from the first light source part 110 is input to the output unit 300 to form an optical path that faces an input surface 311 of the output unit 300.

A configuration and a shape of the light concentrating unit 200 are not limited to the illustrated embodiment, and various embodiments may be applied as long as the light output from the first light source part 110 may be concentrated and input to the output unit 300.

The output unit 300 includes the output lens part 310 that outputs the light input from the light concentrating unit 200.

In detail, the output lens part 310 may be configured to form a specific first light distribution pattern by outputting the light input from the light concentrating unit 200. The output lens part 310 may include the input surface 311, to which the first light irradiated from the light concentrating unit 200, and an output surface 312, from which the light that passed through the input surface 311 is output.

The output lens part 310 may be a lens having one or more focuses. For example, the output lens part 310 may be an aspheric lens, of which a vertical focus and a horizontal focus are the same. Furthermore, the output lens part 310 may an anamorphic lens, of which a vertical focus and a horizontal focus are different.

The second light source part 120 is provided on one side of the output lens part 310 in the leftward/rightward direction "X", and is configured to irradiate a second light for forming a second light distribution pattern that is different from the first light distribution pattern.

In detail, the second light source part 120 is adapted to implement an optical mechanism having a function that is different from that of the first light source part 110, and may be provided on a side of the output lens part 310 to irradiate the light toward a side surface 313 of the output lens part 310. The second light irradiated from the second light source part 120 may be light having an optical path that is different from that of the first light that is irradiated from the first light source part 110. Accordingly, the second light distribution pattern formed by the second light may have characteristics that are different from those of the first light distribution pattern. For example, when the first light distribution pattern forms a high beam pattern or a low beam pattern, the second light distribution pattern may form a daytime running light (DRL).

The second light source part 120 may be an LED like the first light source part 110, but the present disclosure is not limited thereto.

The output unit 300 further includes a light guide part 350. The light guide is formed in the output lens part 310, and is configured to guide the second light input from the second light source part 120 to the output lens part 310. In detail, in the present disclosure, the light guide for guiding the light irradiated from the second light source part 120 may be integrally formed with the output lens part 310.

In detail, the light guide part 350 may be formed at a portion of the output lens part 310 along an extension direction of the output lens part 310. The light guide part 350 may guide the light irradiated from the second light source part 120 and input to the output lens part 310 such that an optical path that is different from the first light is formed. That is, the light guide part 350 may function as a light guide.

Methods for integrally forming the light guide part 350 in the output lens part 310 are not limited, and various methods may be applied as long as the second light is guided to form the second light distribution pattern. For example, the light guide part 350 may be formed to have a convexo-concave shape (see FIGS. 2 and 3), or may be formed by depositing a reflective material (see FIG. 4).

In the output unit 300 according to an embodiment of the present disclosure, the light guide part 350 having a light guide function and the output lens part 310 may be integrally formed whereby the light irradiated from the first light source part 110 and the light irradiated from the second light source part 120 may form different optical paths. In other words, the output unit 300 according to the present disclosure may form an optical path that implements two optical mechanisms with one lens.

Accordingly, according to an embodiment of the present disclosure, two or more functions may be implemented even when the output lens part 310 has a slim shape.

Furthermore, according to the present disclosure, because two or more lighting images or lamp images may be implemented through the output unit 300, an image that is differentiated in design may be implemented. Accordingly, a product value of the product may be enhanced.

Here, the lighting image means an image of the lamp 10 for a vehicle when the first light source part 110 or the second light source part 120 is turned on, and the lamp image means an image of the lamp 10 for a vehicle, which is irrelevant to whether the first light source part 110 or the second light source part 120 is turned on or off.

The output lens part 310 may include the input surface 311, to which the light concentrated by the light concentrating unit 200 is input, and the output surface 312 which is opposite to the input surface 311 and, to which the input light is output. Furthermore, the output lens part 310 may include an upper surface 314 that is provided at upper ends of the input surface 311 and the output surface 312, and a lower surface 315 that is provided at lower ends of the input surface 311 and the output surface 312.

Furthermore, the light guide part 350 may be integrally formed on at least some of the input surface 311, the upper surface 314, and the lower surface 315 of the output lens part 310.

In detail, the light guide part 350 may be formed at various locations of the output lens part 310 as long as the second light input from a side of the output lens part 310 to an interior thereof may be guided and output through the output surface 312 of the output lens part 310. A location of the light guide part 350 may be changed according to a design specification of the lamp 10 for a vehicle.

For example, as in the illustrated embodiment, the light guide part 350 may be formed at an upper end portion of the input surface 311, and on the upper surface 314. In this case, the light output from an upper end area of the output lens part 310 may form the second light distribution pattern, and the light output from an area of the output lens part 310, except for the upper end area thereof, may form the first light distribution pattern.

However, when the output lens part 310 is viewed from an outside, it may appear as if the light was emitted in a similar area of the output surface 312 and it may appear as if the light was emitted in another area. Alternatively, due to a difference between the densities of the first light and the second light, it may appear as if the area, in which the light guide part 350 is formed, and the remaining areas had a brightness difference or a color difference.

Accordingly, a uniform light emission image may be implemented or a gradation light emission image may be implemented by changing a light guide structure according to a purpose of design by using the structural feature and the optical characteristics.

For example, the output lens part 310 may extend in the leftward/rightward direction "X". Furthermore, the light guide part 350 may guide the second light such that the second light travels along the extension direction of the output lens part 310 by reflecting the second light irradiated from the second light source part 120.

In this case, the optical path of the second light may be a path, in which the second light is output to a front side after being generated by the second light source part 120, being input through a side of the output lens part 310, and traveling along the extension direction of the output lens part 310.

FIGS. 2 to 4 illustrate an embodiment of the light guide part 350. However, the light guide part 350 is not limited to the illustrated embodiment, and a shape and a formation method of the light guide part 350 may be changed according to a design specification and a lamp design of the lamp 10 for a vehicle without departing from the technical range of the present disclosure.

For example, referring to FIGS. 2 and 3, the light guide part 350 may include a plurality of optics 351 and 352 that protrude to reflect the second light input to the output lens part 310.

In detail, the plurality of optics 351 and 352 may be continuously formed along the leftward/rightward direction "X" of the output lens part 310. The optics 351 and 352 may be formed to reflect the second light such that the second light travels to a front side or in the leftward/rightward direction "X".

The plurality of optics 351 and 352, as in the illustrated embodiment, may have the same shape and the same size, and may have different shapes and different sizes. For example, although not illustrated, the plurality of optics 351 and 352 may be formed such that sizes thereof become gradually larger or smaller as they go to one side in the leftward/rightward direction "X" of the output lens part 310. Accordingly, the second light distribution pattern or the lighting image may be formed in a shape that is gradually changed along the leftward/rightward direction "X".

However, the shapes of the plurality of optics 351 and 352 are not limited to the above-described ones.

For example, referring to FIG. 4, the light guide part 350 may include a plurality of reflective layers 353 that are formed to reflect the second light input to the output lens part 310 and include a reflective material.

In detail, the plurality of reflective layers 353 may be formed by depositing the reflective material, such as aluminum, on the output lens part 310. The second light may be reflected at a portion, at which the reflective material is formed, and thus, an image of the second light distribution pattern may be determined.

Shapes, sizes, and an arrangement of the plurality of reflective layers 353 may be changed according to a design specification of the lamp 10 for a vehicle. For example, as in the embodiment illustrated in FIG. 4, the sizes of the plurality of reflective layers 353 may be gradually changed as they go from one side to an opposite side in the leftward/rightward direction "X" of the output lens part 310.

In detail, the plurality of reflective layers 353 may have circular shapes, and the sizes thereof may become gradually smaller as they go to one side in the leftward/rightward direction "X" of the output lens part 310. Accordingly, the second light distribution pattern or the lighting image may be formed in a shape that is gradually changed along the leftward/rightward direction "X".

However, the shapes and sizes of the plurality of reflective layers 353 are not limited, and may be modified to have various shapes and sizes.

Figure 5:
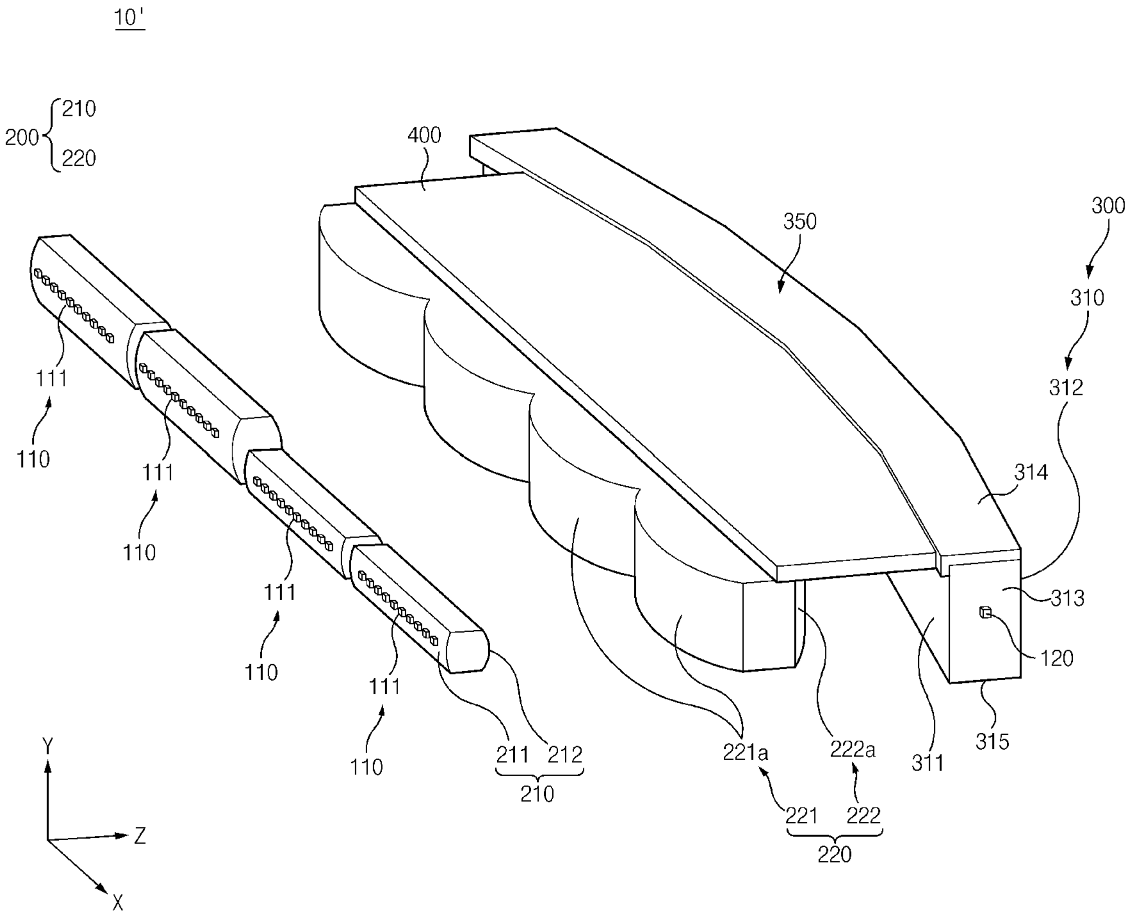
FIG. 5 is a view illustrating an example of a light guide part applied to a lamp for a vehicle according to a second embodiment of the present disclosure.
Figure 6:
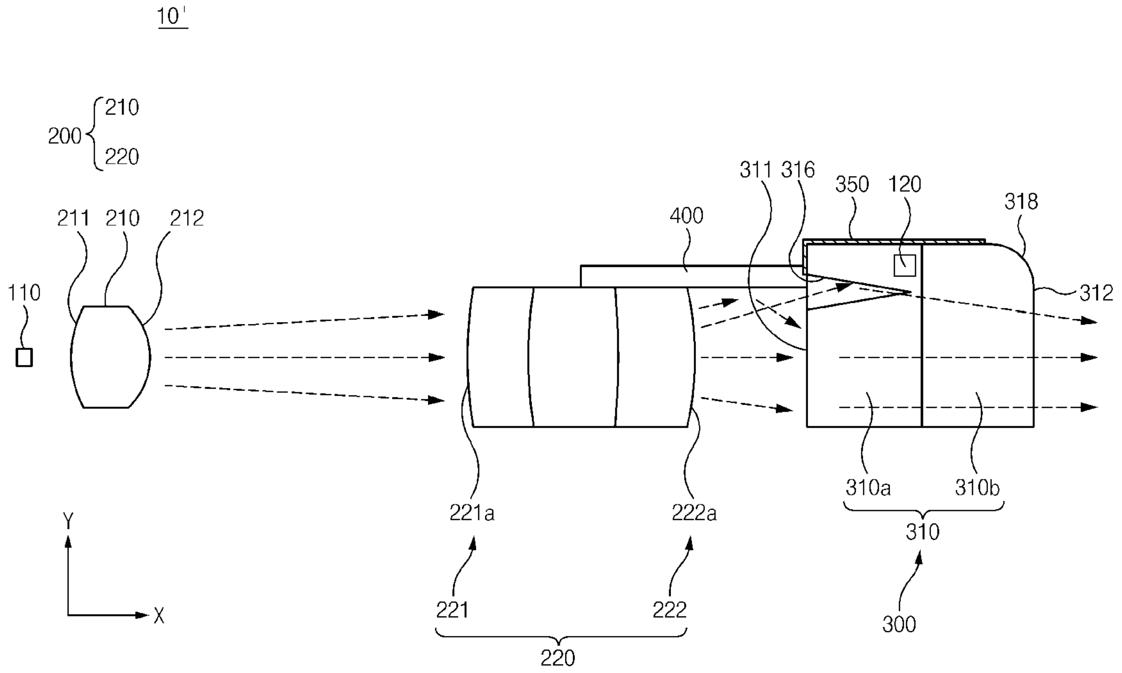
FIG. 6 is a side view of a first modified example of a lamp for a vehicle according to a second embodiment of the present disclosure, when viewed from a lateral side.
Figure 7:
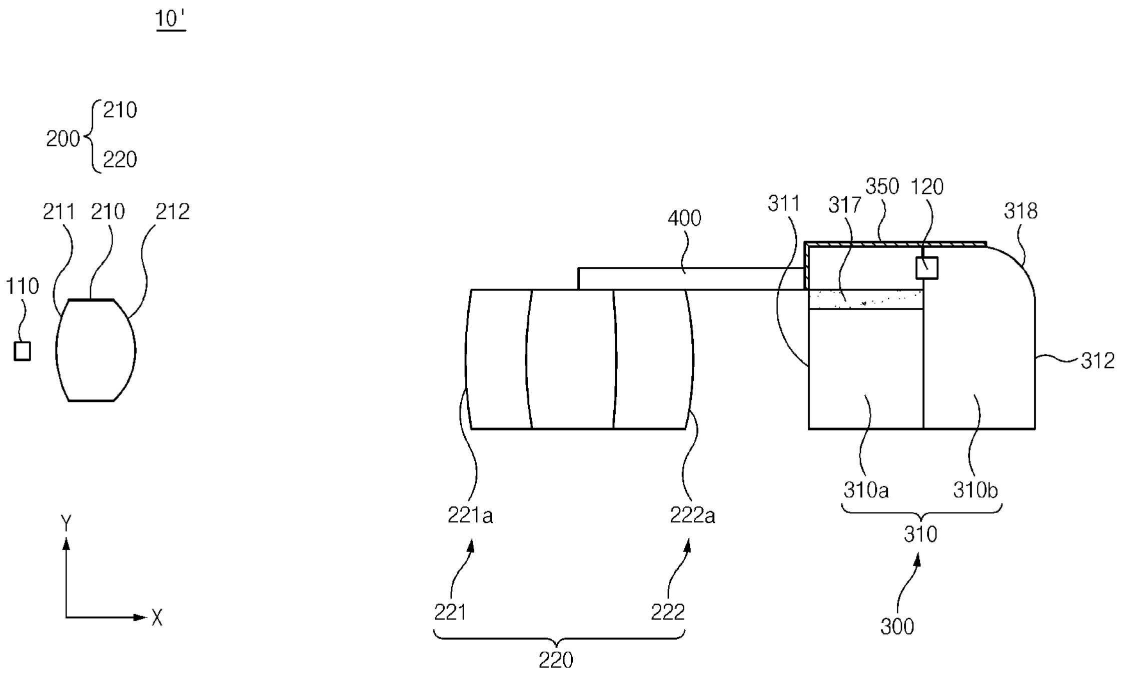
FIG. 7 is a side view of a second modified example of a lamp for a vehicle according to a second embodiment of the present disclosure, when viewed from a lateral side.
Figure 8:
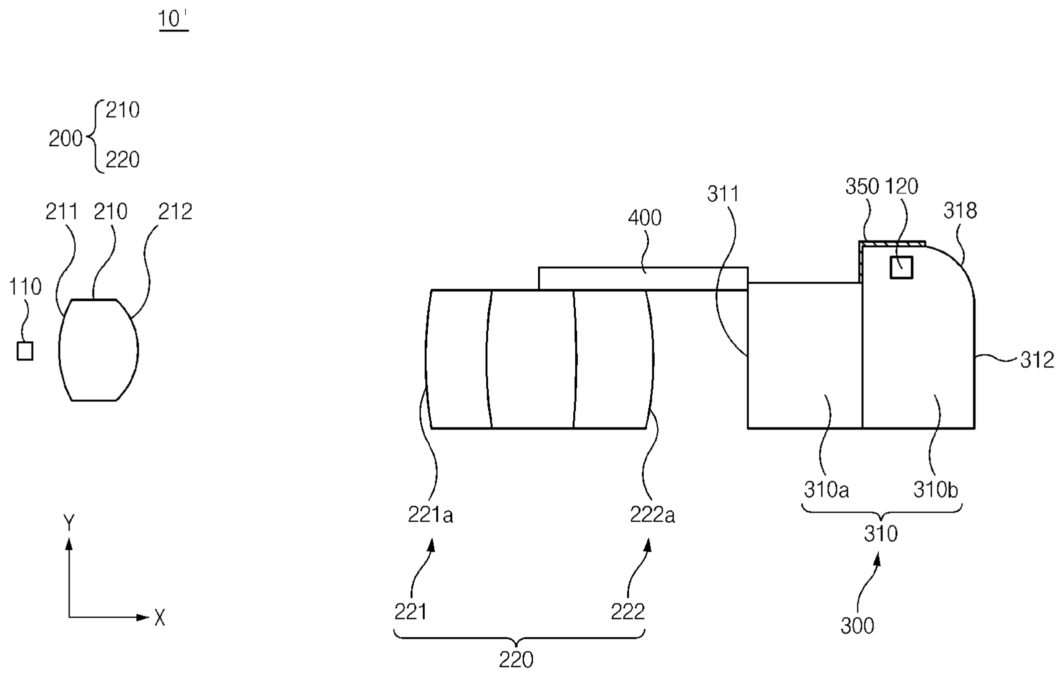
FIG. 8 is a side view of a third modified example of a lamp for a vehicle according to a second embodiment of the present disclosure, when viewed from a lateral side.
Figure 9:
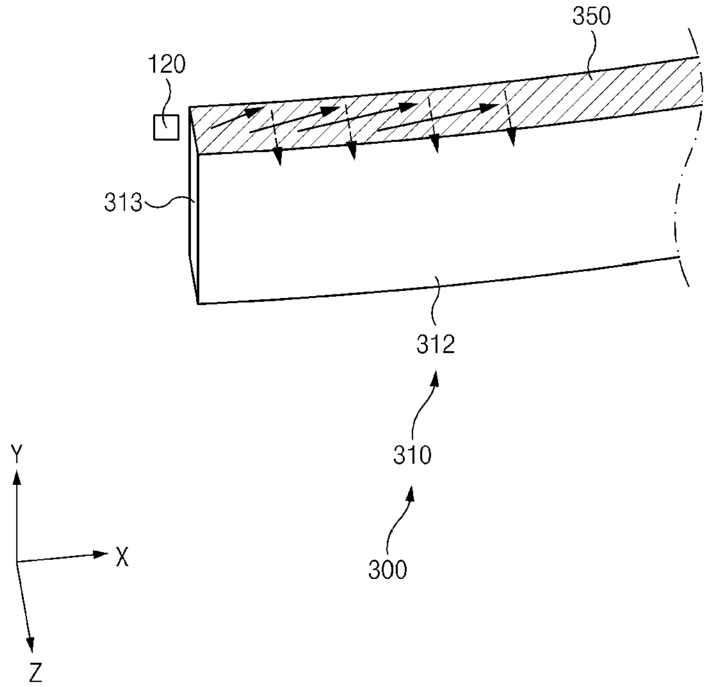
FIG. 9 is a view of an optical path by an optical guide part according to a second embodiment of the present disclosure, when viewed from a front side.
Figure 10:
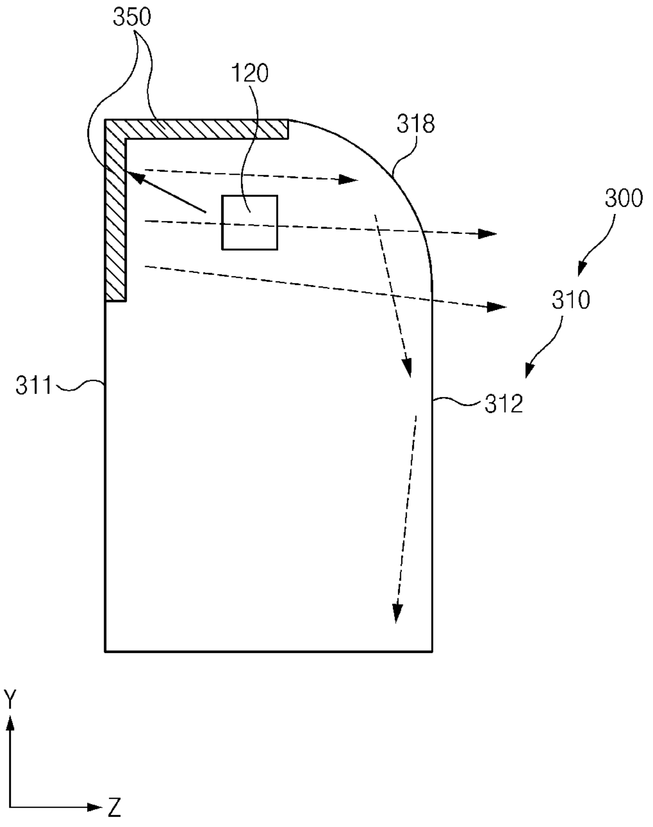
FIG. 10 is a view of an optical path by a lamp for a vehicle according to a second embodiment of the present disclosure, when viewed from a lateral side.

Meanwhile, hereinafter, a second embodiment of the present disclosure will be described with reference to FIGS. 5 and 10. FIG. 5 is a view illustrating an example of a light guide part applied to a lamp for a vehicle according to a second embodiment of the present disclosure, FIG. 6 is a side view of a first modified example of the lamp for a vehicle according to the second embodiment of the present disclosure, when viewed from a lateral side, FIG. 7 is a side view of a second modified example of the lamp for a vehicle according to the second embodiment of the present disclosure, when viewed from a lateral side, FIG. 8 is a side view of a third modified example of the lamp for a vehicle according to the second embodiment of the present disclosure, when viewed from a lateral side, FIG. 9 is a view of an optical path by the lamp for a vehicle according to the second embodiment of the present disclosure, when viewed from a front side, and FIG. 10 is a view of an optical path by the lamp for a vehicle according to the second embodiment of the present disclosure, when viewed from a lateral side.

The second embodiment of the present disclosure is different from the first embodiment in that it further includes a shield member 400 and in a shape of the output lens part 310. Accordingly, the second embodiment of the present disclosure may include all of the features of the first embodiment. Hereinafter, a detailed description of the same configuration as the above-described configuration will be omitted.

Hereinafter, a part of the input surface 311 of the output lens part 310, in which the light guide part 350 is formed, will be defined as a light guide area, and an area of the input surface 311, except for the light guide area, will be defined as an output area. The first light may be input to the output lens part 310 through the output area, and an optical path of the second light may be formed by the light guide area.

Furthermore, the second embodiment of the present disclosure may further include the shield member 400. The shield member 400 may be provided in a direction that faces the light concentrating unit 200 of the output lens part 310 and be installed on a path of the first light such that the light irradiated from the light concentrating unit 200 toward the output unit 300 faces the output area.

For example, one end of the shield member 400 may be located at an upper end portion of the light concentrating unit 200, and an opposite end of the shield member 400 may be located at a point, at which the light guide area and the output area meet each other.

In detail, the shield member 400 may have a plate shape, and may be installed in parallel to a ground surface. The shield member 400 may be configured to absorb at least a portion of the first light, totally reflect the remaining portions of the first light, and input the remaining portions to the output area of the input surface 311. That is, the first light may be prevented from being input to the light guide area.

For example, the light concentrating unit 200 may include a first light concentrating lens part 210 that is disposed on a front side of the first light source part 110, and a second light concentrating lens part 220 that is disposed on a front side of the first light concentrating lens part 210. Furthermore, one end of the shield member 400 may be located at an upper end portion of the second light concentrating lens part 220. Furthermore, an opposite end of the shield member 400 may be located at a border of the light guide area and the output area. Accordingly, the first light may be guided to be input to the output area.

According to the second embodiment of the present disclosure, as compared with the above-described first embodiment, a uniformity of the first light distribution pattern and the second light distribution pattern may be enhanced by the shield member 400, and a quality of the lighting image may be enhanced. Accordingly, an optical quality and a product value may be enhanced by minimizing a glare phenomenon that occurs due to an uneven light uniformity.

In detail, according to the first embodiment of the present disclosure, when the first light irradiated from the first light source part 110 is input to the output lens part 310, it may be input to the light guide part 350 or may be irradiated to the light guide part 350 due to refraction and reflection thereof in an interior of the output lens part 310. In this case, because the light is output in a form that is not designed, the first light distribution pattern or the second light distribution pattern may form noisy light or glares. In this case, an optical performance of a lamp 10' for a vehicle may be influenced.

According to the second embodiment of the present disclosure, by installing the shield member 400, the first light irradiated from the first light source part 110 may be guided such that it is input to an area, in which the light guide part 350 of the output lens part 310 is not formed, whereby an optical quality may be enhanced.

Meanwhile, referring to the second embodiment illustrated in FIG. 6, the output lens part 310 may include a recessed part 316. The recessed part 316 may be formed to be recessed on the input surface 311 toward the output surface 312 such that the first light input to the input surface 311 faces the output surface 312.

In detail, the output lens part 310 may include an input lens 310*a*, to which the first light is input and an upper end portion of which is connected to an opposite end of the shield member 400, and an output lens 310*b* which is formed on a front side of the input lens 310*a*, of which a height of the upper surface 314 is formed to be higher than the upper surface 314 of the input lens 310*a*, and in which a curved surface 318 is formed at a portion, at which the upper surface 314 and a front surface meet each other. For convenience of description, a direction, in which the light is output from the output lens part 310, will be defined as a forward direction and an opposite direction to the forward direction will be defined as a rearward direction.

In this way, the output lens part 310 may include the input lens 310*a* and the output lens 310*b* that are disposed along an optical axis direction. Furthermore, the input lens 310*a* and the output lens 310*b* may be integrally formed while contacting each other.

Furthermore, the recessed part 316 may be formed in the input lens 310*a* to be recessed. For example, the recessed part 316 may be formed on the input surface 311 to have a “V” shape or a “U” shape. Furthermore, the recessed part 316 may be formed at a specific depth in a direction that faces the output surface 312 from the input surface 311. The recessed part 316 may be formed such that the light that is input to the output lens part 310 and reaches the recessed part 316 is output to a front side.

Accordingly, the first light may not be input to a first area that is an area, to which the second light is guided by the light guide part 350, and may be output to a front side through the output surface 312.

Meanwhile, with reference to a modified example of the second embodiment illustrated in FIG. 7, the output lens part 310 may include a guide layer 317. The guide layer 317 may be located at a location, at which the light guide area and the output area meet each other, such that the first light input to the input surface 311 is guided to face the output surface 312, may be formed in an interior of a body of the output lens part 310, and may include a reflective material.

The guide layer 317 may perform a function that is similar to that of the above-described recessed part 316. In detail, the guide layer 317 may be formed at a specific depth in a direction that faces the output surface 312 from the input surface 311. Furthermore, the guide layer 317 may reflect the light that reaches the guide layer 317 after being input to the output lens part 310 and output the light to a front side.

Various methods may be applied with no limitation as the method for forming the guide layer 317. For example, when the output unit 300 is formed, the output lens 310*b*, and the output area of the input lens 310*a* may be primarily formed, the guide layer 317 may be formed by depositing the reflective material, and the output unit 300 may be finished by forming the light guide area of the input lens 310*a* thereafter. However, the method for forming the output unit 300, in which the guide layer 317 is formed, is not limited to the above method.

As described above, the output lens part 310 includes the input lens 310*a* and the output lens 310*b*.

The first light may be input to the input lens 310*a*, and the upper end portion thereof may be connected to an opposite end of the shield member 400. The output lens 310*b* may be formed on a front side of the input lens 310*a*, and a height of the upper surface 314 may be formed to be higher than that of the upper surface 314 of the input lens 310*a*. Furthermore, the curved surface 318 may be formed in the output lens 310*b* at a portion, at which the upper surface 314 and the output surface 312 meet each other.

The light guide part 350 may be formed in an area of the upper surface 314 of the output lens 310*b* or the rear surface of the output lens 310*b*, which is higher than the upper surface 314 of the input lens 310*a*.

In this way, because the curved surface 318 is formed at a portion, at which the upper surface of the output lens 310*b* and the output surface 312 meet each other, the second light reflected by the light guide part 350 may be reflected by the curved surface 318 and travel to a lower end of the output lens part 310. In more detail, due to the structure, in which the curved surface 318 is formed in the output lens part 310, the second light reflected by the light guide part 350 may be output to the front surface and the second light may be guided to a lower end of the output lens part 310 through total reflection on the curved surface 318 as well. Accordingly, the present disclosure may implement a lighting image in a gradation form in the upward/downward direction on the entire output surface 312 of the lens.

Furthermore, a height of the upper surface 314 of the output lens 310*b* may be larger than a height of the upper surface 314 of the input lens 310*a* and the light guide part 350 may be formed one of the upper surface 314 of the output lens 310*b*, and an area of the rear surface of the output lens 310*b*, which is higher than the input lens 310*a*, whereby the total reflection of the second light may be activated in an interior of the output lens part 310. Accordingly, according to the embodiment of the present disclosure, the second light may be sufficiently delivered to an opposite end of the output lens part 310 in the leftward/rightward direction “X” when the second light source part 120 is turned on.

Meanwhile, referring to FIGS. 1 and 5, the light concentrating unit 200 may include the first light concentrating lens part 210 and the second light concentrating lens part 220. However, the light concentrating unit 200 is not limited to an embodiment that will be described below, but various modified examples may be applied as long as the light irradiated from the first light source part 110 may be input to the output lens part 310.

The first light concentrating lens part 210 may be disposed on a front side of the first light source part 110 and may be configured to concentrate the light input from the first light source part 110. Furthermore, the second light concentrating lens part 220 may be disposed on a front side of the first light concentrating lens part 210, and may be configured to concentrate the light input from the first light concentrating lens part 210.

Furthermore, the first light concentrating lens part 210 may be formed to diffuse the concentrated light in the upward/downward direction "Y" and input the light to the second light concentrating lens part 220, and the second light concentrating lens part 220 may be formed to diffuse the concentrated light in the leftward/rightward direction "X" and input the light to the output lens part 310.

In detail, the light concentrating unit 200 may include the first light concentrating lens part 210 and the second light concentrating lens part 220, which are separated from each other, and the first light concentrating lens part 210 and the second light concentrating lens part 220 may be disposed to be spaced apart from each other in the optical axis direction.

For example, the first light concentrating lens part 210 may include unit lenses that are separated from each other, and the plurality of unit lenses may be arranged in the leftward/rightward direction "X". A plurality of first light sources 111 included in the first light source part 110 may be disposed on a rear side of the first light concentrating lens part 210, and may irradiate the light to the input surface 311 of the first light concentrating lens part 210. Furthermore, for example, the first light source part 110 may include a plurality of light source groups, and each of the light source groups may include a plurality of light sources. Furthermore, the light source groups may be located at locations corresponding to the plurality of unit lenses, respectively. However, the configuration and the arrangement of the first light source part 110 are not limited to the above description.

The first light concentrating lens part 210 may include a first input surface 211, to which the first light is input, and a first output surface 212, from which the first light is output. A vertical cross-section of the first input surface 211 may be formed to have a shape that is convex toward the first light source part 110. A vertical cross-section of the first output surface 212 may be formed to have a shape that is convex toward the second light concentrating lens part 220.

Accordingly, the first light concentrating lens part 210 may concentrate the first light input from the first light source part 110, diffuse the light in the upward/downward direction "Y, input the light to the second light concentrating lens part 220.

Meanwhile, the second light concentrating lens part 220 may include a second input surface 221, to which the first light is input, and a second output surface 222, from which the first light is output. The second input surface 221 may be divided to a plurality of unit input surfaces 221*a*, and the second output surface 222 may be divided to a plurality of unit output surfaces 222*a*. The plurality of unit input surfaces 221*a* may be integrally formed, and the plurality of unit output surfaces 222*a* may be integrally formed.

The plurality of unit input surfaces 221*a* may be arranged in the leftward/rightward direction "X" of the second light concentrating lens part 220. Horizontal cross-sections of the plurality of unit input surfaces 221*a* may be formed to be convex in a direction that faces the first light concentrating lens part 210.

Furthermore, the plurality of unit output surfaces 222*a* may be arranged in the leftward/rightward direction "X" of the second light concentrating lens part 220. The plurality of unit output surfaces 222*a* may be disposed to correspond to the plurality of unit input surfaces 221*a*, respectively. Horizontal cross-sections of the plurality of unit output surfaces 222*a* may be formed to be convex in a direction that faces the output lens part 310.

Accordingly, the second light concentrating lens part 220 may concentrate the first light input from the first light concentrating lens part 210, diffuse the light in the leftward/rightward direction "X", and input the light to the output lens part 310. Then, the first light concentrating lens part 210 and the second light concentrating lens part 220 may be formed such that a diffusion degree of the first light concentrating lens part 210 in the upward/rightward direction "Y" is smaller than a diffusion degree of the second light concentrating lens part 220 in the leftward/rightward direction "X". For example, curvatures of horizontal cross-sections of the unit output surfaces 222*a* of the second output surface 222 may be formed to be larger than curvatures of vertical cross-sections of the first output surface 212.

Due to the structure of the light concentrating unit 200, the first light may be input to the output lens part 310 while minimizing the optical loss even when the output lens part 310 in a form that is slim in the leftward/rightward direction is used. In detail, the light concentrating unit 200 may implement the slim output lens part 310 and the lamp 10' for a vehicle by making the shapes of the light concentrating lens that determines an optical path, in the upward/downward direction "Y", of the first light irradiated from the first light source part 110 and the light concentrating lens that determines an optical path, in the leftward/rightward direction "Y", of the first light different.

However, the light concentrating unit 200 according to the embodiment of the present disclosure is not limited to the above description, and various forms of optical parts may be applied as long as the first light may be properly concentrated on or at the vicinity of a focus of the output lens part 310 and be input to the output lens part 310. For example, the light concentrating unit 200 may include one light concentrating lens, and may include an optical part in a form of a reflective surface.

The lamp for a vehicle according to the embodiment of the present disclosure may form an optical path that implements two optical mechanisms with one lens by integrally forming the light guide part that functions as a light guide function and the output lens part that is a lens for forming a focus.

According to the embodiment of the present disclosure, two or more optical functions may be implemented even when the output lens part is slim.

Accordingly, according to the present disclosure, because two or more lighting images or lamp images may be implemented through the output unit, a product value of the product may be enhanced by implementing an image that is differentiated in design.

Although the specific embodiments of the present disclosure have been described above, the spirits and range of the present disclosure are not limited thereto, and the present disclosure may be variously corrected and modified by an ordinary person in the art, to which the present disclosure pertains, while not changing the essence of the present disclosure described in the claims.

What is claimed is:

1. A lamp for a vehicle, comprising:

a first light source part configured to irradiate a first light for forming a first light distribution pattern;

a light concentrating unit configured to concentrate the first light emitted from the first light source part;

an output unit comprising an output lens part configured to output light input from the light concentrating unit; and a second light source part provided on one side of the output lens part in a leftward/rightward direction, and configured to irradiate a second light for forming a second light distribution pattern that is different from the first light distribution pattern, wherein the output unit further comprises a light guide part formed in the output lens part and configured to guide the second light from the second light source part to the output lens part, wherein the output lens part comprises:

an input surface configured to input the light concentrated by the light concentrating unit;

an output surface, opposite to the input surface, and configured to output the input light;

an upper surface provided at upper ends of the input surface and the output surface; and a lower surface provided at lower ends of the input surface and the output surface, wherein the light guide part is integrally formed on at least some of the input surface, the upper surface, and the lower surface of the output lens part.

2. The lamp of claim 1, wherein the light guide part is located at an upper end portion of the input surface and on the upper surface.

3. The lamp of claim 1, wherein the output lens part extends in the leftward/rightward direction, and the light guide part is configured to guide the second light such that the second light travels along an extension direction of the output lens part by reflecting the second light irradiated from the second light source part.

4. The lamp of claim 1, wherein the light guide part comprises a plurality of optics protruding to reflect the second light input to the output lens part.

5. The lamp of claim 1, wherein the light guide part comprises a plurality of reflective layers configured to reflect the second light input to the output lens part and comprising a reflective material.

6. The lamp of claim 5, wherein sizes of the plurality of reflective layers are gradually changed as they go from one side to an opposite side of the output lens part in the leftward/rightward direction.

7. The lamp of claim 1, further comprising:

a shield member, when a part of the input surface of the output lens part in which the light guide part is formed is defined as a first area, and an area of the input surface except for the first area is defined as a second area, provided in a direction that faces the light concentrating unit of the output lens part such that the light irradiated from the light concentrating unit toward the output unit and installed on a path of the first light.

8. The lamp of claim 7, wherein one end of the shield member is located at an upper end portion of the light concentrating unit, and an opposite end of the shield member is located at a point at which the first area and the second area meet each other.

9. The lamp of claim 7, wherein the shield member is configured to absorb at least a portion of the first light, totally reflect the remaining portion of the first light, and input a remaining portion to the second area of the input surface.

10. The lamp of claim 7, wherein the output lens part comprises a recessed part in the input surface that is recessed toward the output surface such that the first light input to the input surface faces the output surface.

11. The lamp of claim 7, wherein the output lens part comprises a guide layer located at a location at which the first area and the second area meet each other such that first light input to the input surface faces the output surface, formed in an interior of a body of the output lens part, and comprising a reflective material.

12. The lamp of claim 7, wherein when a direction in which the light is output from the output lens part is defined as a forward direction and an opposite direction to the forward direction is defined as a rearward direction, and the output lens part comprises:

an input lens, to which the first light is input, and an upper end portion of which is connected to an opposite end of the shield member; and an output lens formed in the forward direction of the input lens, of which a height of the upper surface is formed to be higher than the upper surface of the input lens, and in which a curve is formed at a portion at which the upper surface and the output surface meet each other, wherein the light guide part is formed in an area of the upper surface of the output lens or a rear surface of the output lens, which is higher than the upper surface of the input lens.

13. The lamp of claim 1, wherein the light concentrating unit comprises:

a first light concentrating lens part disposed in a forward direction of the first light source part, and configured to concentrate the first light input from the first light source part; and a second light concentrating lens part disposed in the forward direction of the first light concentrating lens part and configured to concentrate the light from the first light concentrating lens part, wherein:

the first light concentrating lens part is configured to diffuse the concentrated light in an upward/downward direction and input the light to the second light concentrating lens part, and the second light concentrating lens part is configured to diffuse the concentrated light in the leftward/rightward direction and input the light to the output lens part.

* * * * *